United States Patent [19]
Rouet et al.

[11] Patent Number: 6,097,396
[45] Date of Patent: Aug. 1, 2000

[54] METHOD AND APPARATUS FOR CREATING LIFELIKE DIGITAL REPRESENTATION OF HAIR AND OTHER FINE-GRAINED IMAGES

[75] Inventors: Christian Rouet; Jeffery B. Yost, both of San Rafael, Calif.

[73] Assignee: Lucas Digital Ltd, San Rafael, Calif.

[21] Appl. No.: 08/901,934

[22] Filed: Jul. 29, 1997

Related U.S. Application Data

[63] Continuation of application No. 08/565,838, Dec. 1, 1995, Pat. No. 5,758,046.

[51] Int. Cl.$^7$ .................................................. G06T 17/00
[52] U.S. Cl. ............................................................. 345/430
[58] Field of Search .................................. 345/419, 418, 345/420, 429, 430, 433, 435

[56] References Cited

U.S. PATENT DOCUMENTS

| | | | |
|---|---|---|---|
| 5,758,046 | 5/1998 | Rouet et al. | 345/430 |
| 5,764,233 | 6/1998 | Brinsmead et al. | 345/430 |

*Primary Examiner*—Phu K. Nguyen
*Assistant Examiner*—Cliff N. Vo
*Attorney, Agent, or Firm*—Irell & Manella LLP

[57] ABSTRACT

Methods and apparatus are disclosed for creating lifelike digital representations of scenes that include numerous fine-grained objects such as hair. Individualized geometric models are defined for a selected, manageable subset of the fine-grained objects. By interpolating based upon these defined geometric models, subject to user-specified hair parameters, geometries are subsequently generated for the full set of fine-grained objects. Rendering techniques are used to generate two-dimensional image projections of these geometries, as seen from a specified point of view. These steps of geometric interpolation and rendering are performed in an iterative manner, such that the numerous fine-grained objects are processed and rendered portion by portion, thereby greatly reducing the computational complexity of the task. Other aspects of the invention include the use of depth information regarding individual hairs for purposes of performing accurate rendering. Selected portions of depth and velocity information are also retained and utilized in order to composite and motion blur, in a reasonably accurate manner, the rendered hair image projections together with other three-dimensional scene elements.

13 Claims, 6 Drawing Sheets

METHOD AND APPARATUS FOR CREATING LIFELIKE DIGITAL REPRESENTATION OF HAIR AND OTHER FINE-GRAINED IMAGES

This is a continuation of application Ser. No. 08/565,838, filed Dec. 1, 1995 now U.S. Pat. No. 5,758,046.

FIELD OF THE INVENTION

The present invention relates to computer graphics techniques for creating lifelike digital representations of fine-grained objects such as hair or feathers.

BACKGROUND OF THE INVENTION

Creating lifelike digital representations of creatures with hair poses difficult problems in the field of computer graphics. (Herein, we use the term "hair" broadly, so as to encompass hair, fur, and the like.) Achieving a high degree of visual realism demands that the computer-generated image reflect lifelike deviations and imperfections with respect to characteristics including shape, texture, texture, color, lighting, separation, and curvature, all at the granular level of individual hairs. However, because a typical image literally involves millions of individual hairs, it has in the past seemed impractical from a computational standpoint to apply this degree of high fidelity computer graphics modeling to hair. The prior art in this field has therefore generally failed to provide tools that realistically model, animate, and render hair with attention to the appearance and characteristics of individual hairs. Such prior art approaches are generally unsatisfactory for important applications where high fidelity is critical, such as providing computer graphics special effects for motion pictures.

A further, related challenge is the need to integrate hair elements with other scene elements in a consistent manner. For example, hair elements created through the use of computer graphics techniques should exhibit characteristics such as motion blur and shadowing to the same extent that other objects in the scene do. Otherwise, image realism can be compromised.

The failure of prior art techniques to take individual hair characteristics into account, and to integrate hair properly with other scene elements, has typically resulted in special effects which are all too obvious to motion picture viewers, and therefore unconvincing. A computer graphics methodology for modeling, animating and rendering hair images in a manner that is both highly realistic as well as computationally practical is therefore needed. More broadly, such a methodology could prove equally valuable in analogous computer graphics applications, wherever it is desired to represent images made up of a relatively high density of individual image elements having both common and independent image characteristics.

SUMMARY OF THE INVENTION

The present invention provides methods and apparatus for creating lifelike digital representations of three-dimensional scenes that include numerous fine-grained objects such as hair. Steps and means are described by which individualized geometric models are defined for a selected, manageable subset of the fine-grained objects. Using interpolation based upon these defined geometric models, geometries are subsequently generated for the full set of fine-grained objects. Rendering techniques are then used to generate two-dimensional image projections of these geometries, as seen from a specified point of view. These steps of geometric interpolation and rendering are performed in an iterative manner, such that the numerous fine-grained objects are processed and rendered portion by portion, thereby greatly reducing the computational complexity of the task.

Other aspects of the invention include the use of depth information regarding individual hairs for purposes of performing accurate rendering. Selected portions of depth information are also retained and utilized in order to composite, in a reasonably accurate manner, the rendered hair image projections together with other three-dimensional scene elements. A further feature of the invention allows users to texture map hair parameters such as hair color, density, and light reflecting properties over the surface containing the hair. These hair parameters allow the user additional control over the process of hair generation and rendering described above.

DETAILED DESCRIPTION OF THE INVENTION

Basic Architecture and Methodology

Figure 1:
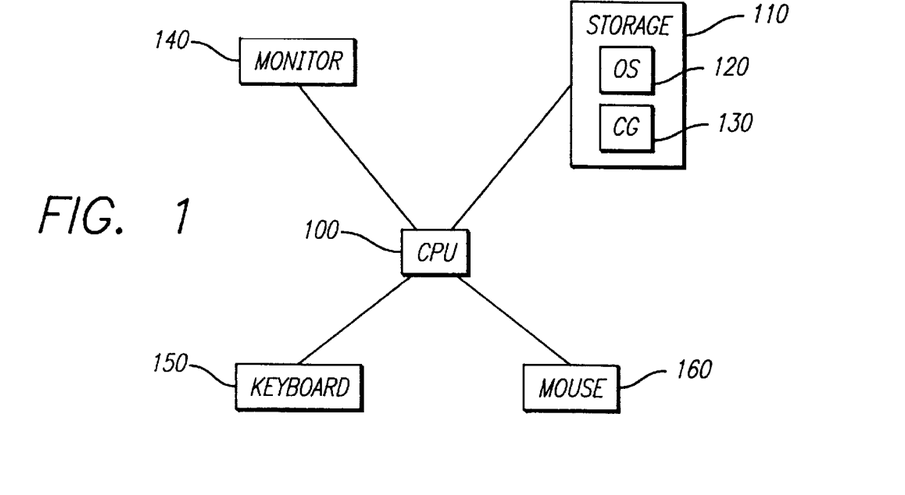
FIG. 1 provides a general illustration of preferred computer apparatus for implementing the present invention.

FIG. 1 depicts the general architecture of a digital computer system for implementing the present invention. Processor 100 is a standard digital computer processor, preferably a workstation-class processor such as SILICON-GRAPHICS INDIGO2-EXTREME for interactive work, or SILICON-GRAPHICS CHALLENGE SERVERS FOR BATCH PROCESSING, running preferably the IRIX5.3 operating system. Although the processor 100 is shown as one unit, it will be appreciated that separate processes may be employed for interactive use and batch processing. System software 120 is stored on storage unit 110, e.g., a standard internal fixed disk drive. Also preferably stored on storage unit 110 is computer graphics ("CG") software 130 which, in accordance with the present invention, performs the tasks of modelling, texture mapping, generating, interpolating, animating, rendering, and compositing, as described in greater detail below. Interactive user input, where referenced below, is provided via standard input peripherals such as keyboard 150 and/or mouse 160. Graphical output created by processor 100 under control of CG software 130 is transmitted to video monitor 140 for display to users; equivalently, output may also be transmitted to a printing devices to generate hard copy output in the form of videotape, film, slides, or the like.

Figure 2:
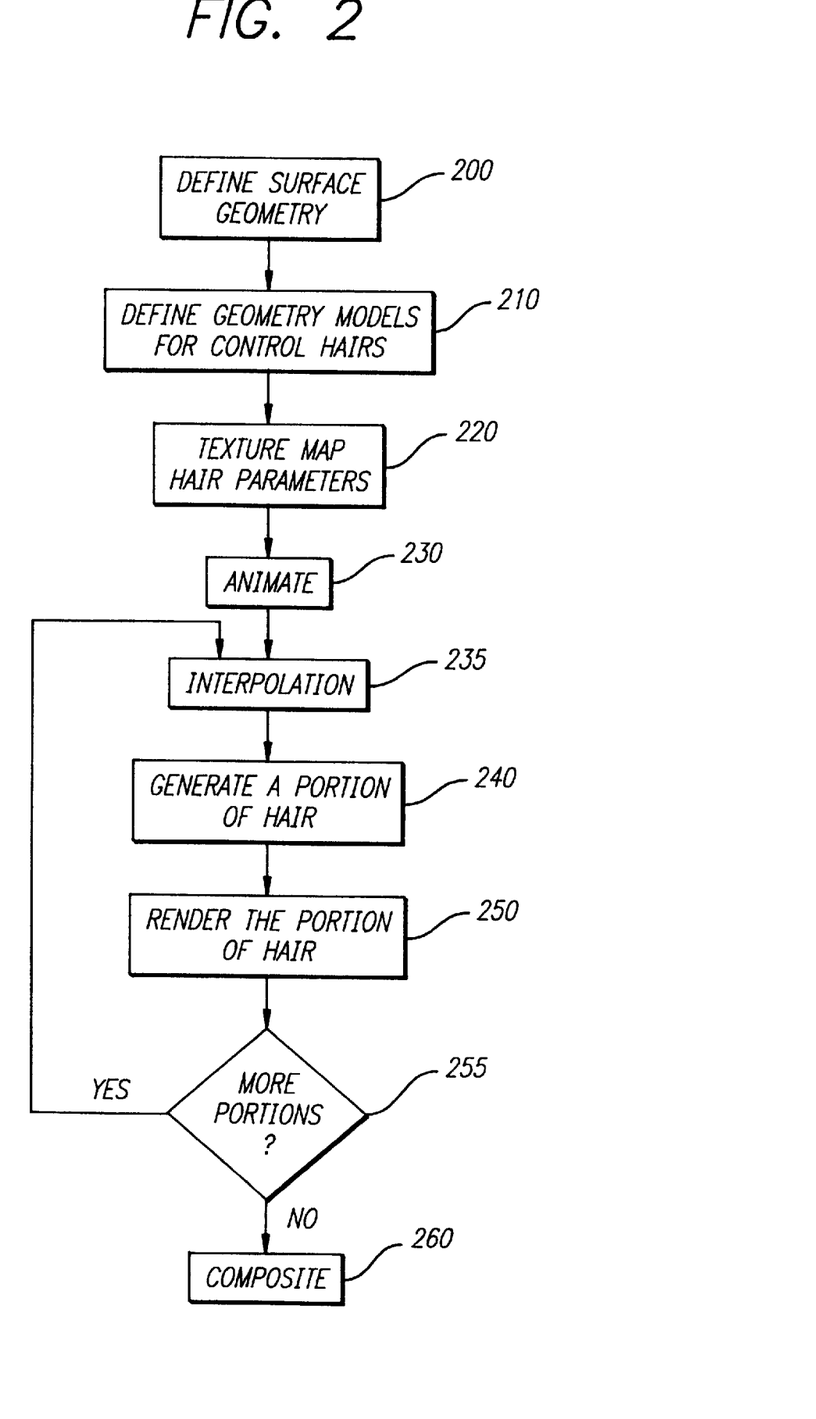
FIG. 2 is a flow diagram illustrating a preferred methodology in accordance with the present invention.

FIG. 2 is a flow diagram depicting a preferred methodology in accordance with the present invention. At step 200, the user defines a three-dimensional geometry for the skin or similar surface of the creature upon which hair is to be placed. At step 210, the user specifies a three-dimensional, geometric model for the actual hair. As will be described in greater detail below, the user need not specify explicit, separate geometries for each individual hair object, nor is the user restricted to defining a single, invariant geometry for the hair as a whole. Instead, in accordance with the present invention, the user specifies explicit geometries for a selected subset of individual hairs, which we refer to herein as "control hairs." This control hair information is used subsequently, as will be described below, to generate or "grow" a full head or body of hair automatically.

At step 220, the user creates texture maps specifying various hair parameters to control the subsequent generation of hair. These parameters may include, for example, density, color, light reflecting properties, individual hair thickness, and geometric perturbations. Texture maps are used in this step, so that these parameters can vary over the surface of the creature in a manner that is both natural and convenient. Commercially available programs can be used to assist an animator in creating a texture map, or else those of skill in the art may create custom tools of similar nature to suit the needs of particular applications and computational environments.

At step 230, the geometry and hair parameter information specified during steps 210 and 220 is animated over time. Preferably, this is accomplished by performing steps 210 and 220 with respect to a plurality of key frames, and then using conventional interpolation techniques to animate the transitions between key frames. In principle, any or all of the hair parameters specified during step 220 can be animated over time, but those of skill in the art will appreciate that some hair parameters are by nature invariant with respect to time, and should not be animated for certain images. For example, in natural animals, hair density may vary with respect to position on the animal's body, but typically does not vary with respect to time.

At step 235, interpolation techniques are used to generate or "grow" for each frame a full head or body of hair, based on the control hair information specified at step 210 and the texture map hair parameters specified at step 220. At step 240, a generation step is performed in which various characteristics for all or part of the full head or body of hair may be changed. For example, it may be desirable to make a subset of the hair more curly. A texture map may be drawn to indicate the desired curliness for a patch of hair, and the generation step transforms the hair according to the texture map. As will be appreciated, the generation step 240 may involve the transformation of any type of hair characteristic in any manner. Further, the generation step may utilize other inputs, such as a random or constant value, apart from a texture map to indicate how the hairs should change according to the desired characteristic.

Interpolation step 23S and generation step 240 are closely coupled with rendering step 250, which involves projecting the three-dimensional information regarding the hair objects onto a two-dimensional bit map of finite resolution. In order to achieve realistic modeling of hair in a computationally practical manner, the steps of interpolation, generation and rendering are tightly coupled, so that the creatures hair is essentially interpolated, generated and then rendered piece by piece. As will be described in greater detail below, this enables a system in accordance with the present invention to maintain focus on a limited, tractable amount of information in detail at any one moment when dealing with a particular portion of hair, and to thereafter discard most of this detail when moving on to generate and render additional portions of hair.

Finally, at step 260, the fully rendered hair is composited with other elements of the scene being represented. During this step, various interactions and relationships among the different scene objects are preferably taken into account, as discussed below.

Two separate layers of hair, such as two different types of hair textures, may be created by performing steps 200–255 separately for each layer and then performing the compositing step 260.

Having thus far provided an overview of a basic methodology in accordance with the present invention, we will now discuss in greater detail those elements and aspects of the method that warrant further attention.

Geometric Modelling of Control Hairs

Figure 3A:
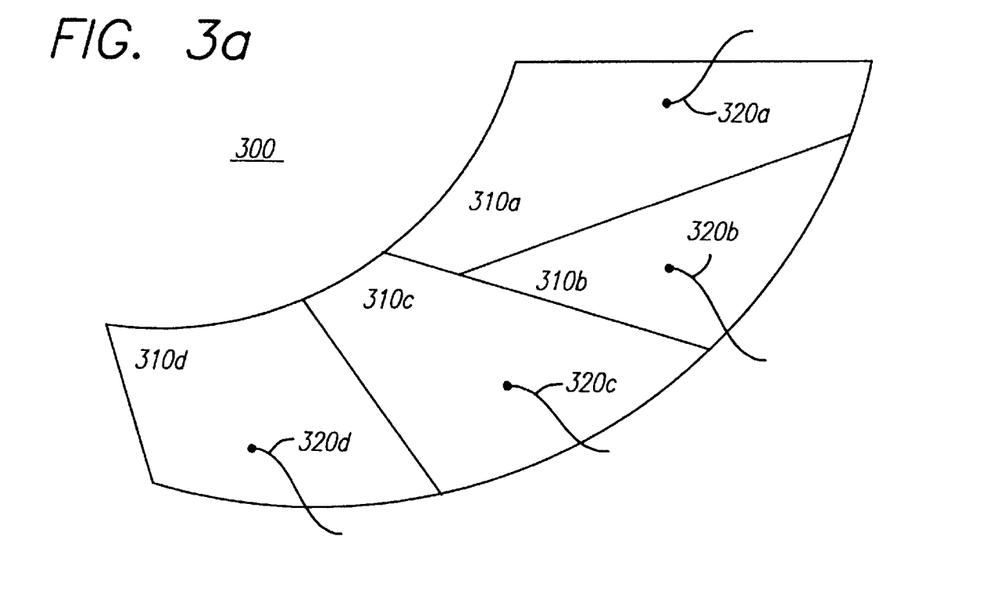
FIG. 3a illustrates a geometric modelling technique utilizing control hairs.

FIG. 3a illustrates a technique by which users define hair geometries at step 210. As noted briefly above, users need not explicitly specify separate geometries for each individual hair object, nor are users restricted to choosing a single, invariant geometry for all hairs. Instead, users can define individual geometries for a user-selected subset of individual hairs, shown in FIG. 3a as control hairs 320a, 320b, 320c, and 320d. Surface 300 represents a portion of body surface or skin on which the hairs are located. During the subsequent hair generating step 230, geometries are automatically defined for the numerous intervening positions on surface 300, by mathematically interpolating between the geometry definitions for the various control hairs 320a–n. In the presently preferred embodiment, scattered data interpolation is employed to interpolate the control hairs 320a–n. (Hair density is typically determined and controlled by hair parameters specified during step 220, as discussed elsewhere herein.) In practice, some portions of hair on a particular individual's body may warrant finer degrees of control than others. Therefore, preferably, the number and spacing of control hairs within surface 300 are specified by the user.

Figure 3B:
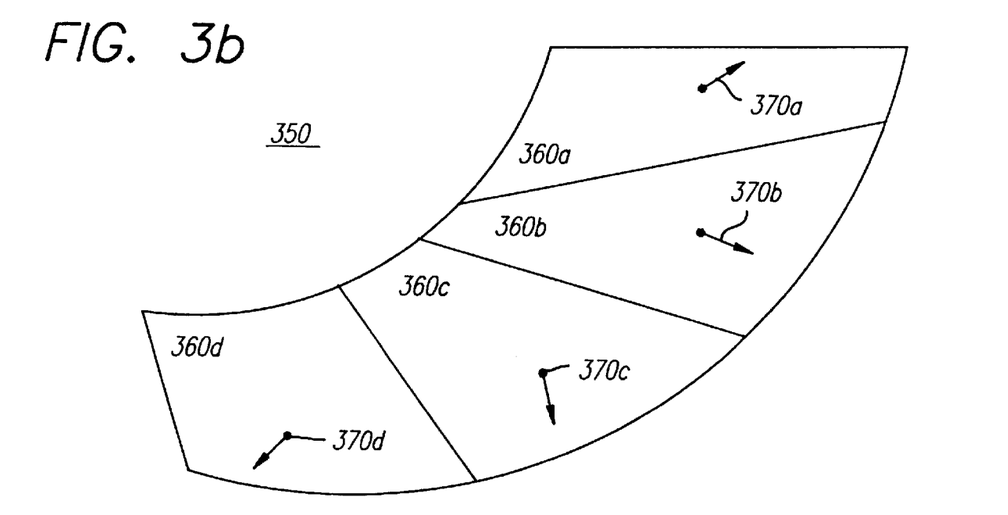
FIG. 3b illustrates a geometric modelling technique utilizing control directions.

FIG. 3b illustrates the use of a somewhat similar technique that is particularly well-suited to defining geometric models for very short hair. In that case, as shown in FIG. 3b, "control directions" 370a, 370b, 370c, and 370d are defined by the user to specify the direction that the hair lies at various positions within surface 350. Once again, generating step 230 uses mathematical interpolation (again, subject to the hair parameters of step 220) to derive hair directions for intervening points on surface 350. This technique is suitable for very short hair, because very short hairs do not have intricate geometries, and it is typically sufficient, for practical purposes, to specify and vary only the directions along which such hair lies.

Generation of Hair

Figure 4:
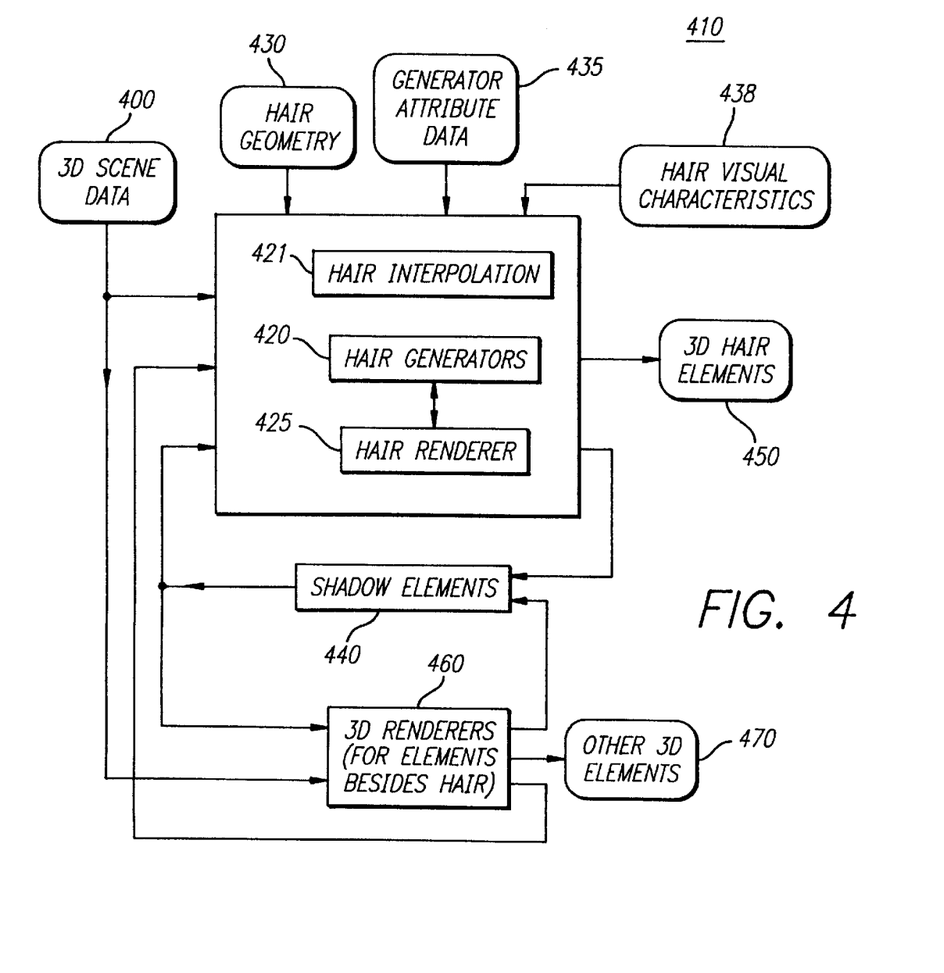
FIG. 4 is a block diagram representing a preferred information flow for the present invention.

FIG. 4 is a block diagram representing a preferred information flow in accordance with the present invention. Note that in this diagram, data inputs and outputs are generally depicted with circles, while processing steps or tasks or depicted with rectangles. As shown in FIG. 4, three-dimensional data 400 describing the scene that is to be graphically represented by the computer system of FIG. 1 is initially input into the system. Data 400 includes three-dimensional geometric descriptions of scene elements, such as surface 300 of FIG. 3a, and all other pertinent scene information such as the location and orientation of a lighting source, and the point of view from which the scene is being viewed.

Software module 410, a component of CG software 130, includes generator software 420 for performing hair generation step 240, hair interpolation software 421 for performing interpolation step 235, and rendering software 425 for performing hair rendering step 425. Hair interpolation software 421 receives several categories of input data: hair geometry data 430, which comprises the control information discussed above in connection with FIGS. 3a and 3b; generator attribute data 435, as discussed earlier in connection with texture mapping step 220; and 3D scene data 400, which includes data that describes the geometry of surface 300 or any other surface upon which hair is to be generated. Using interpolation techniques on geometry data 430, as controlled by generator attribute data 435 (e.g., a hair density parameter) and 3D scene data 400 (e.g., the geometry of surface 300), individual geometries are then generated automatically at step 240 for the large number of hairs covering surface 300.

Generator software 420 receives the interpolated hair information from the hair interpolation software 421. Generator software 420 also receives 3D scene data 400 and characteristics 438, which may comprise any visual trait such as color or shininess. With all of this information, generator software 420 performs generation step 240 which results in the desired patch of hair.

Rendering Details

Figure 5:
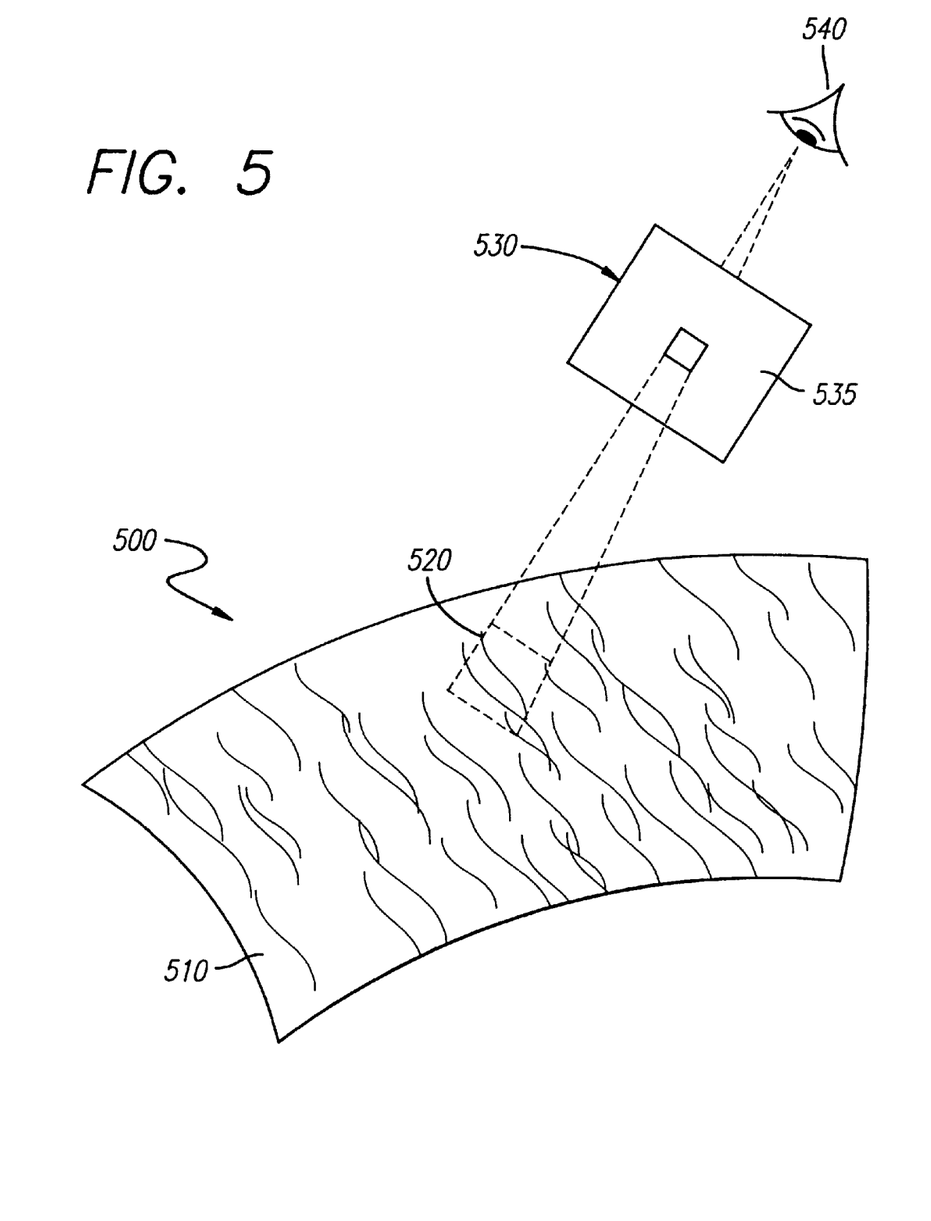
FIG. 5 provides an overview of the rendering task.

FIG. 5 provides an overview of the rendering task that is performed at step 250 by rendering software 425. Basically, rendering entails projecting three-dimensional image information onto a two-dimensional surface from the perspective of a defined point of view. In FIG. 5, three-dimensional hairs such as hair 510 are attached to surface 500. FIG. 5 illustrates a two-dimensional projection of the hairs growing from region 520 onto pixel 535 within two-dimensional bitmap 530, from the point of view of eye or camera lens 540. The task of rendering is to perform such projections for the entire region of interest (such as all of surface 500), and to compute appropriate values for each corresponding pixel in bitmap 530, all from point of view 540. Rendering may be a particularly complex task for images of hair, because of the large number of individual hair objects (or portions of hair objects) which may occupy all or part of each individual pixel. Referring once again to FIG. 4, note that 3D scene data 400 is available to hair renderer 425, so that rendering software 425 will have access to information regarding the scene's light source, the point of view, and the shape of the skin or surface upon which the hair is located.

Rendering basically entails scan-converting or sampling of hair objects so as to generate raster data. In a preferred embodiment of the present invention, rendering is performed by rendering software 425 using the "curve rendering" technique, familiar to those of ordinary skill in the art. Using curve rendering, hairs can efficiently be modelled as one-dimensional (i.e., single-parameter) curves within three-dimensional space.

Preferably, curve rendering is augmented by rendering software 425 with an anti-aliasing technique, in order to eliminate undesirable aliasing effects. Thus, sampling a hair object does not simply generate a 1-bit "yes" or "no" for each pixel, but instead generates a relative measure of opacity that the sampled hair contributes to each pixel. In a simple model, opacity may be calculated as a measure of the approximate fraction of the pixel covered by the hair, if the hairs are modelled as very narrow tubes. Preferably, in a color system, opacity values also reflect the color and/or other hair parameters of each hair; for example, the opacity of a blonde hair which covers ten percent of a pixel may be modelled by a numeric value equal to ten percent of the value of a completely blonde pixel. In this way, it is possible to generate an overall opacity value for each pixel by summing together the opacity values contributed by each hair whose projection intersects the pixel.

Figure 6:
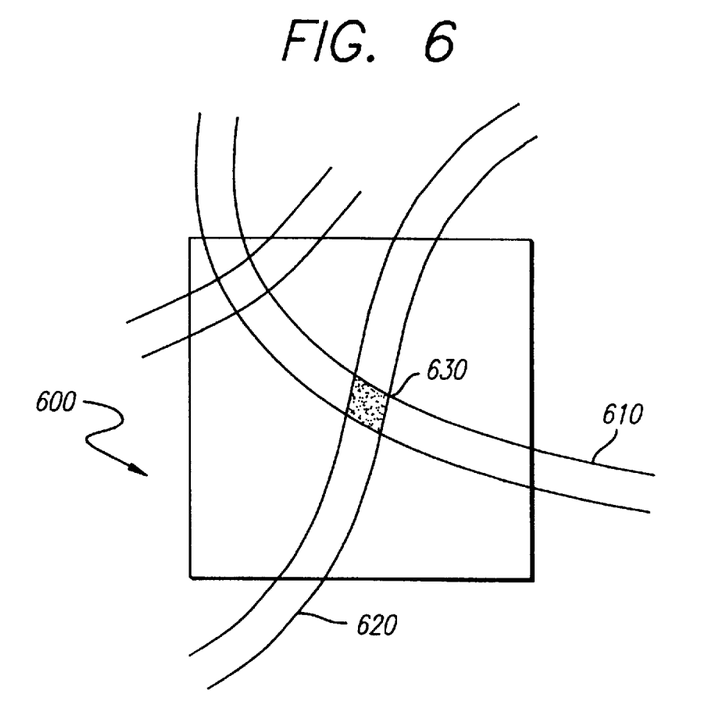
FIG. 6 illustrates a preferred anti-aliasing technique for rendering hair in accordance with the present invention.

Complications may arise in applying the foregoing anti-aliasing technique, in the context of overlapping hairs. It is important to avoid double-counting overlapping opacity contributions. For example, FIG. 6 illustrates pixel 600 intersected by a plurality of overlapping hair objects. Thus, for example, darkened region 630 is crossed by hairs 610 and 620. One might therefore suppose that for purposes of the opacity calculation, the effective area of either hair 610 or 620 should be reduced by an amount corresponding to the area of region 630, in order to avoid double-counting when summing the opacity contribution of hairs 610 and 620. However, recall that in accordance with the present invention, individual hairs may differ from one another in terms of a variety of hair parameters such as color and light reflection. Therefore, it is not sufficient merely to detect overlaps such as region 630 and to subtract the opacity contribution of region 630 from the overall opacity sum for pixel 600. Rather, renderer 425 preferably determines which one of multiple overlapping hairs is uppermost and actually visible from the defined point of view, and computes an opacity contribution reflecting the visible hair's color and hair parameters.

Figure 7:
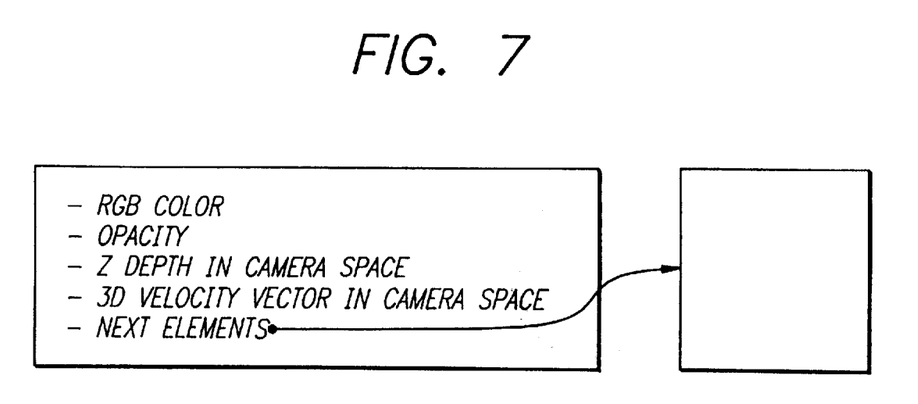
FIG. 7 illustrates a preferred data structure for representing hair image information computed during the rendering process.

In order to successfully take three-dimensional visibility into account when computing the opacity contribution of each hair, a preferred embodiment of the present invention preserves three-dimensional information regarding the hairs projected onto each pixel. FIG. 7 illustrates a preferred data structure for representing pertinent hair image information for each pixel. As illustrated in FIG. 7, each pixel is represented by a linked list. Each list element corresponds to an individual hair intersecting the pixel. Each list elements includes the percentage of the overall pixel represented by that region, the color and other image parameter values of the hair, and depth and velocity information indicating the relative depth and motion of that hair in the scene from the perspective of the defined point of view.

Iterative Generating and Rendering of Hair

As noted earlier in connection with FIG. 2, hair generating step 240 and rendering step 250 preferably are performed in an iterative manner. In other words, using FIG. 3a as an example, during each iteration only a portion of surface 300 and control hairs 310a–n are processed as to hair generation. The portion of hair for which geometry has been generated is then rendered at step 250. As shown in FIG. 2 by decision point 255, this iterative process continues for additional portions of hair until all hairs in the scene have been processed and rendered.

This portion-by-portion, iterative technique enables the processing of a very large number of individual hairs to be accomplished with limited, finite computational resources. The amount of hair to be processed at each iteration depends on the computational resources available to a given practitioner.

Note that the preferred architecture of FIG. 4 is flexible enough to accommodate scenes comprising objects besides hair. Thus, 3D renderers 460 are preferably utilized to generate 3D element data 470 for scene objects besides hair. These other renderers 460 may be conventional, commercially available rendering packages, or may be custom designed for special kinds of scene objects and applications. This flexible architecture reflects the fact that scene elements other than hair may well not share the high-density and non-uniform properties of hair, and may therefore be dealt with more effectively and efficiently using other rendering techniques. Rendering information from 460 is sent to 425, to insure a better quality of non furry object's edges, as well as to avoid rendering hairs entirely hidden by a foreground opaque object. Note also in FIG. 4 that during the rendering process, renderers 425 and 460 preferably exchange shadow information 440 regarding the various objects they are rendering. This information exchange is conducted because in a three-dimensional scene, some objects may cause shadowing effects upon other objects, depending on the location of the various objects relative to the scene's light source. Such shadowing effects should be taken into account by the renderers.

Compositing

Figure 8:
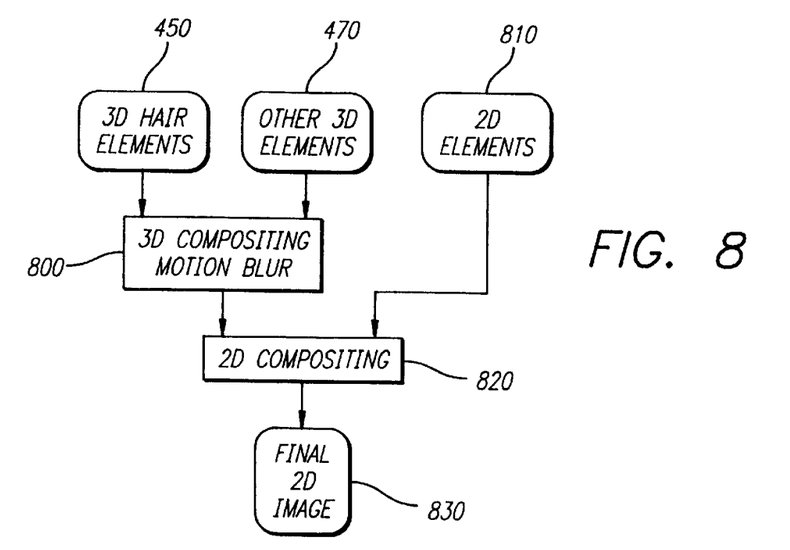
FIG. 8 is a block diagram representing further aspects of a preferred information flow in accordance with the present invention.

At step 260, the fully rendered hair is combined (or "composited") with other elements of the scene being represented. FIG. 8 shows a block diagram representing a preferred information flow for the compositing process, in accordance with the present invention. Once again, in this diagram, data inputs and outputs are generally depicted with circles, while processing steps or tasks or depicted with rectangles. As in FIG. 4, the output of rendering step 250 is depicted in FIG. 8 as hair data 450. Broadly speaking, and as shown in FIG. 8, hair data 450 is combined during the compositing process with data 470 regarding other three-dimensional scene elements, and with data 810 regarding various two-dimensional scene elements (such as background scenery, for example), ultimately yielding final two-dimensional image 830 which graphically depicts the original scene as viewed from the defined point of view.

Hair data 450 and data 470 include some amount of three-dimensional depth information in addition to the straightforward two-dimensional projection data produced by the rendering step, because such depth information allows these three-dimensional elements to be properly integrated during the compositing process. Such processing is depicted in FIG. 8 as three-dimensional compositing step 800. For example, if a hair is blocked by another scene object that lies closer to the camera, the blocked hair should not be visible in the generated image. Maintaining at least some depth information regarding hairs permits detection of situations where such blockage occurs. However, in the interests of computational efficiency, the amount of three-dimensional depth information that is maintained and utilized during compositing need not be as extensive and detailed as the depth information utilized during rendering.

For example, if a linked list such as illustrated in FIG. 7 is used to capture three-dimensional hair information during rendering, hair data 450 would preferably include only a subset of that information. One possible approach would be to rank the elements of a FIG. 7 linked list by the magnitude of each element's opacity contribution, and to discard all but the most significant contributors, i.e., all but some fixed number of list elements. Alternatively, all list elements with less than some predetermined threshold opacity contribution could be discarded. Only the remaining elements not discarded would then be maintained as hair data 450 for the compositing process at step 800. In same cases, this compositing step was even performed on a single element, the one which has the higher opacity in the list, with acceptable visual results.

Figure 9:
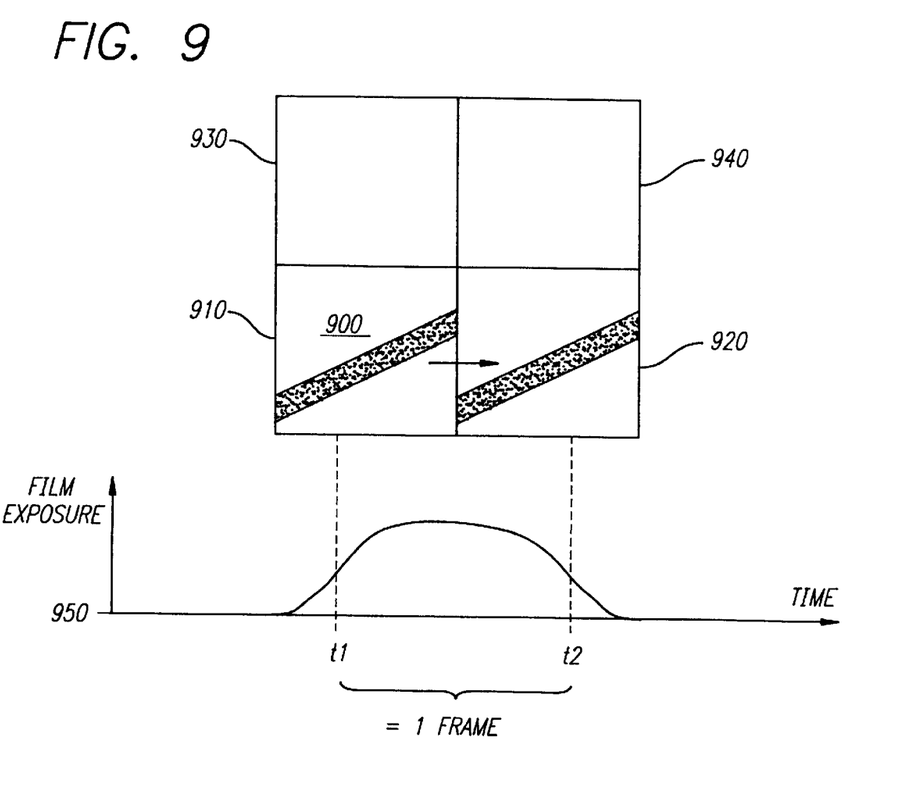
FIG. 9 illustrates the phenomenon of motion blur.

The phenomenon of motion blurring provides a further example of how depth and velocity information may be utilized advantageously during the compositing process. Suppose that we wish to composite CG hair onto an animal moving within a three-dimensional scene, and that the moving animal has been filmed using a camera having an exposure rate illustrated by graph 950 of FIG. 9. In that illustration, the exposure rate is shown as t2–t1. Suppose further that motion blur is assumed to cause each pixel representing the animal to move roughly one pixel to the right during the exposure time for each frame. Stated differently, motion blur means that our digital image of the moving animal includes a copy of each pixel of the animal image superimposed onto its right-adjacent pixel. Photorealism demands that the animal's hair exhibit a consistent degree of motion blur.

Therefore, in a preferred embodiment of the present invention, the CG hair is artificially "blurred" during composite step 800. Roughly speaking, for the example of FIG. 9, the opacity contribution made by each hair to each pixel should be added to the right adjacent pixel as well. Thus, in FIG. 9, the opacity contribution of hair 900 with respect to pixel 910 is applied to adjacent pixel 920 as well. Preferably, however, the technique is sill more refined, and takes advantage of the hair depth information referred to above. In particular, the motion blur computation during the three-dimensional compositing step considers the Z-coordinate depth and velocity of each hair relative to other objects in the scene, just as discussed above. If motion blurring would move a hair into a position in which the hair would no longer be visible because it would lie behind some other, obscuring object, then the opacity contribution for the hair in that new position is taken into account for the corresponding pixel.

Other Variations

Detailed illustrations and preferred embodiments of computer graphics methods and apparatus in accordance with the present invention have been provided above for the edification of those of ordinary skill in the art, and not as a limitation on the scope of the invention. Numerous variations and modifications within the spirit of the present invention will of course occur to those of ordinary skill in the art in view of the preferred embodiments that have been disclosed herein. Such variations, as well as any other systems embodying any of the following claims, all remain within the scope of the present invention:

We claim:

1. A method of representing the appearance of a surface covered with a plurality of similar objects by computer animation, the method comprising the steps of:

identifying a geometric model of a control object at each of a plurality of control points in accordance with a texture map of the surface to be covered, the control objects being a subset of a plurality of similar objects;

animating the control objects; and covering the surface with a plurality of objects in accordance with the control objects and the texture map.

2. The method of claim 1 wherein the step of covering the surface with a plurality of objects further comprises:
   generating a subset of the plurality of objects by interpolation between the control objects;
   rendering the subset of the plurality of objects; and
   repeating the steps of generating and rendering until the surface is covered.

3. The method of claim 2 wherein the step generating a subset of the plurality of objects by interpolation further comprises:
   generating a subset of the plurality of objects by scattered data interpolation from control objects.

4. The method of claim 1 further comprising the step of:
   compositing the covered surface with other elements of a computer animation scene.

5. The method of claim 1 wherein the step of identifying a geometric model of a control object at each of the plurality of control points in accordance with a texture map further comprises:
   identifying a geometric model of a first layer control object at each of the plurality of first layer control points in accordance with a texture map;
   identifying a geometric model of a second layer control object at each of the plurality of second layer control points in accordance with a texture map;
   and the step of covering the surface with a plurality of objects further comprises:
      covering the surface with a plurality of first layer objects in accordance with the first layer control objects and the first layer texture map;
      covering the surface with a plurality of second layer objects in accordance with the second layer control objects and the second layer texture map; and
      compositing the plurality of first layer objects and the plurality of second layer objects.

6. The method of claim 2 wherein the step of rendering the subset of the plurality of objects further comprises:
   rendering the subset of the plurality of objects as 1-dimensional curves in 3-dimensional space.

7. The method of claim 2 wherein the step of rendering the subset of the plurality of objects further comprises:
   rendering the subset of the plurality of objects to determine a relative measure of opacity that each object contributes to each element of a display.

8. The method of claim 1 wherein the plurality of objects further comprises: a plurality of flexible, linear objects.

9. The method of claim 8 wherein the plurality of flexible, linear objects further comprises hair.

10. The method of claim 8 wherein the plurality of flexible, linear objects further comprises fur.

11. The method of claim 8 wherein the plurality of flexible, linear objects further comprises grass.

12. A sequence of images comprising:
   one or more images including a surface apparently covered with a plurality of similar objects, the one or more images formed by
   identifying a geometric model of a control object at each of a plurality of control points in accordance with a texture map of the surface to be covered, the control objects being a subset of a plurality of similar objects;
   animating the control objects; and covering the surface with a plurality of objects in accordance with the control objects and the texture map.

13. The sequence of images of claim 12 wherein the plurality of similar objects are selected from the group of linear, flexible objects consisting of hair, fur and grass.

* * * * *